3,222,372
PRODUCTION OF 1,3,4-OXADIAZOLES
Hans Weidinger and Heinz Eilingsfeld, Ludwigshafen (Rhine), Germany, assignors to Badische Anilin- & Soda-Fabrik Aktiengesellschaft, Ludwigshafen (Rhine), Germany
No Drawing. Filed May 2, 1963, Ser. No. 277,447
Claims priority, application Germany, May 4, 1962,
B 67,108
3 Claims. (Cl. 260—296)

This invention relates to the production of 1,3,4-oxadiazoles.

It is known that 1,3,4-oxadiazoles are obtained by allowing an imidoether salt to act on a carboxylic acid hydrazide at elevated temperature and in the presence of a solvent. It is possible to allow the imidoether salt to form in the reactor by treating a corresponding nitrile in the presence of an alcohol with a strong acid, for example hydrogen chloride (U.S. patent application Serial No. 799,075, filed March 13, 1959, by Hans Weidinger and Joachim Kranz, now U.S. Patent 3,065,-238).

It is further known that triazoles are obtained by reacting carboxylic hydrazides with N-substituted imide chlorides. For example, 1,2,5-triphenyl triazole is obtained from benzoic hydrazide and N-phenyl benzimide chloride according to the equation:

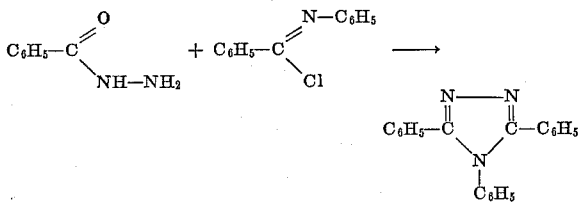

It is a disadvantage of this method that N-substituted imide chlorides are not easily accessible.

It is an object of the present invention to provide a process for the production of 1,3,4-oxadiazoles using starting materials which are very readily accessible. It is another object of the invention to provide a process by which 1,3,4-oxadiazoles are obtained in very good yields and excellent purity.

These and other objects and advantages of our invention are achieved by reacting a N,N-disubstituted carboxylic amide chloride having the formula:

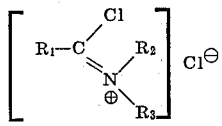

in which $R_1$ denotes a hydrogen atom, an aliphatic radical with 1 to 4 carbon atoms, a cycloaliphatic radical with 6 to 8 carbon atoms or an aryl radical which contains 6 to 16 carbon atoms and may bear alkoxy having 1 to 4 carbon atoms, chlorine, dialkylamino having 1 to 4 carbon atoms in each alkyl, a nitro group, and/or a quinone grouping, $R_2$ and $R_3$ may each denote an alkyl radical having 1 to 4 carbon atoms, or the two alkyl radicals together with the nitrogen atom may form a 5- to 7-membered heterocyclic ring, the carboxylic amide chloride otherwise having hydrocarbon structure, at a temperature between 20 and 200° C. in the presence of an alcohol and a base with a carboxylic hydrazide of the formula

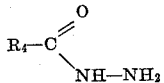

in which $R_4$ denotes an aliphatic radical having 1 to 7 carbon atoms, a cycloaliphatic radical having 6 to 8 carbon atoms, a pyridine radical or an aryl radical which contains 6 to 16 carbon atoms and may bear an alkoxy group having 1 to 4 carbon atoms, a chlorine atom, a dialkylamino group with 1 to 4 carbon atoms in each alkyl, an amino group or a nitro group and/or which may contain a quinone grouping or a carboxylic hydrazide group.

The reaction is preferably carried out at a temperature between 50° and 170° C.

When using N,N-dimethyl-p-methoxybenzamide, for example, the reaction may be represented by the equation:

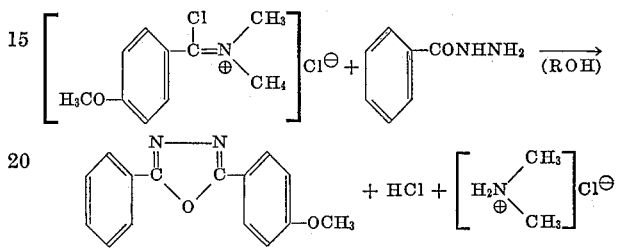

Examples of carboxylic hydrazides which may be reacted with amide chlorides are hydrazides of aliphatic monocarboxylic acids having two to eight carbon atoms, aromatic monocarboxylic or dicarboxylic acids having 7 to 18 carbon atoms, heterocyclic aromatic monocarboxylic acids which contain a nitrogen atom in the ring, and also the hydrazides of cycloaliphatic monocarboxylic acids. Such carboxylic acids include acetic acid, propionic acid, butyric acid, valeric acid, cyclohexanecarboxylic acid, benzoic acid, p-methoxybenzoic acid, p-chlorobenzoic acid, p-dimethylaminobenzoic acid, m-nitrobenzoic acid, p-toluic acid, isonicotinic acid, anthraquinone-2-carboxylic acid, 1,4-diaminoanthraquinone-2-carboxylic acid, 1-chloroanthraquinone - 2 - carboxylic acid, 1-aminoanthraquinone-2-carboxylic acid, terephthalic acid, isophthalic acid.

The N,N-disubstituted carboxylic amide chlorides to be used as initial materials may be prepared easily from N,N-disubstituted carboxylic amides and phosgene. Suitable N,N-disubstituted carboxylic amide chlorides are derived from carboxylic amides which on the nitrogen atom bear identical or different alkyl radicals which together with the nitrogen atom may form a heterocyclic ring.

The disubstituted amino group is split off as ammonium salt during the reaction. It is therefore advantageous to use amide chlorides derived from N,N-disubstituted carboxylic amides whose nitrogen atom bears two low molecular weight alkyl radicals, such as methyl or ethyl radicals. Examples are:

N,N-dimethylformamide,
N,N-diethylformamide,
N-formylpyrrolidine,
N-formylpiperidine,
N,N-dimethylacetamide,
N,N-dimethylpropionamide,
N,N-dimethylvaleroamide,
N-butyropyrrolidine,
N,N-dimethylcyclohexane carboxylic amide,
N,N-diethylcyclooctanecarboxylic amide,
N-cyclohexoylpiperidine,
N,N-dimethylbenzamide,
N-(p-methoxybenzoyl)-piperidine,
N,N-dimethyl-p-chlorobenzamide,
N,N-dimethyl-p-dimethylaminobenzamide,
N,N-dimethyl-p-methoxybenzamide,
N,N-dimethyl-m-nitrobenzamide,
N,N-dimethyl-p-toluamide.

It is an essential feature of the process according to this invention that the reaction is carried out in the presence of an alcohol. If the reaction is carried out in the absence of an alcohol, then 1,3,4-triazoles are obtained rather than 1,3,4-oxadiazoles. Examples of suitable alcohols are alkanols having one to six carbon atoms, for example methanol, ethanol or propanol or ethylene glycol, one hydroxy group of which is etherified with an alkanol having one to six carbon atoms, as for example ethylene glycol monomethyl ether and ethylene glycol monobutyl ether.

It is preferred to use as bases tertiary amines. Especially suitable tertiary amines contain 1 to 2 tertiary nitrogen atoms and 3 to 12 carbon atoms and, except for the nitrogen atoms, have hydrocarbon structure. Such tertiary bases are, for example, triethylamine, tripropylamine, dimethylaniline, diethylaniline and pyridine.

The alcohols and bases may be used in amounts of at least 0.5 mole each per mole of carboxylic amide chloride. The upper limit is not critical. It is advantageous to use amounts between 0.5 and 10, preferably between 1 and 8 moles per mole of carboxylic amide chloride.

The initial materials may be allowed to act on each other for example in equimolar amounts. It is advantageous, however, to use an excess of one of the reactants, for example 1.2 moles of N,N-disubstituted carboxylic amide chloride per mole of carboxylic hydrazide, or conversely. It is however also possible to use a larger excess, for example a two to five times excess. The reaction may be carried out in the presence of solvents or diluents.

Suitable solvents or diluents are organic liquids which are inert under the reaction conditions, such as dimethylformamide, N-methylpyrrolidone, ethylene glycol dimethyl ether and nitrobenzene. The alcohols already mentioned may serve as solvents or diluents when used in excess.

The process may, for example, be carried out by heating a mixture of the N,N-disubstituted carboxylic amide chloride, the carboxylic hydrazide, an alcohol and a tertiary amine to the reaction temperature. In some cases it is advantageous to introduce the N,N-disubstituted carboxylic amide chloride into a mixture of the carboxylic hydrazide, an alcohol and a tertiary amine after the mixture has been brought to the reaction temperature. A particularly advantageous method is to allow the N,N-disubstituted carboxylic amide chloride to form in the reactor from a N,N-disubstituted carboxylic amide and phosgene.

The reaction is usually over within two hours. The 1,3,4-oxadiazoles separate in part from the reaction mixture, usually while still hot. To separate them completely, the reaction mixture may for example be diluted with water or part of the solvent removed by distillation. The deposited substance is filtered off, washed and dried.

The 1,3,4-oxadiazoles thus obtainable in high yields and excellent purity may be used as intermediates, for example for the production of dyes for dyeing articles for example of native and/or regenerated cellulose.

The invention is further illustrated in the following examples in which parts are by weight unless otherwise specified. Parts by volume bear the same relation to parts by weight as the liter (S.T.P.) to the kilogram.

*Example 1*

24.4 parts of benzoic piperidide chloride is introduced at 0° to 20° C. into 125 parts by volume of absolute ethanol and then 15 parts of pyridine is dripped in at 0° C. Then 15 parts of benzoic hydrazide is introduced and the mixture is heated to boiling within 20 to 30 minutes. The reaction mixture is kept at boiling temperature for another 30 to 60 minutes and then allowed to cool. About 200 to 300 parts of water is added. The reaction mixture is filtered, the filter residue washed with water and dried. 20 parts of 2,5-diphenyl-1,3,4-oxadiazole is obtained as colorless crystals having a melting point of 137° to 138° C.

By using the same amount of dimethylaniline instead of pyridine, 2,5-diphenyl-1,3,4-oxadiazole is obtained in the same purity and yield.

*Example 2*

A solution prepared at 0° C. from 24.4 parts of benzoic piperidide chloride and 50 parts of absolute ethanol is allowed to flow slowly at room temperature into a mixture of 15 parts of benzoic hydrazide, 125 parts of N-methylpyrrolidone and 10 parts of pyridine. The reaction mixture is then heated to boiling temperature for one hour. After the mixture has cooled, it is diluted with about 500 parts of water and the deposited product is filtered off, the filter residue washed with water and dried. 20 parts of 2,5-diphenyl-1,3,4-oxadiazole is obtained as colorless crystals having a melting point of 137° to 138° C.

*Example 3*

A solution prepared at 0° C. from 24.4 parts of benzoic piperidide chloride and 100 parts by volume of absolute ethanol is added in one portion to a mixture of 15 parts of benzoic hydrazide, 20 parts of pyridine and 100 parts by volume of absolute ether at 70° C. The reaction mixture is heated at 70° C. for another thirty minutes, then allowed to cool and worked up as described in Example 1. 21 parts of 2,5-diphenyl-1,3,4-oxadiazole is obtained as colorless crystals having a melting point of 137° to 138° C.

*Example 4*

20 parts of phosgene is passed into a solution of 19 parts of benzoic piperidide in 150 parts by volume of diethyl ether at room temperature. The reaction mixture is allowed to stand for two hours and the diethyl ether then distilled off. 150 parts by volume of absolute ethanol cooled to −10° C. is allowed to flow rapidly into the residue, and then 15 parts of pyridine is allowed to drip into the mixture at 0° C. 15 parts of benzoic hydrazide is added to the reaction mixture which is then heated at 70° C. for thirty to sixty minutes, allowed to cool and worked up as described in Example 1. 20 parts of 2,5-diphenyl-1,3,4-oxadiazole is obtained as colorless crystals having a melting point of 137° to 138° C.

*Example 5*

16 parts of N,N-dimethylformamide chloride is dissolved at 0° C. in 75 parts by volume of absolute ethanol and then 18.1 parts of p-nitrobenzoic hydrazide and 8 parts of pyridine are added to this solution. The reaction mixture is heated within thirty minutes to the boiling temperature and stirred at this temperature for another thirty minutes. The mixture is cooled and worked up as described in Example 1. 14.5 parts of 2-(4-nitrophenyl)-1,3,4-oxadiazole is obtained as colorless crystals having a melting point of 146° to 147° C.

*Example 6*

28.1 parts of 1-aminoanthraquinone-2-carboxylic hydrazide and 20 parts by volume of pyridine are added to a mixture, prepared at 0° C., of 28 parts of benzoic piperidide chloride and 280 parts by volume of ethylene glycol monomethyl ether. The reaction mixture is heated within thirty minutes to boiling temperature and kept at this temperature for one hour. The mixture is then cooled and the reaction product filtered off, washed with methanol and dried. 30 parts of 2-(1-aminoanthraquinonyl-(2))-5-phenyl-1,3,4-oxadiazole is obtained as red crystals having a melting point of 309° to 312° C. It is a dye which dyes cotton or linear polyamide textile materials red shades.

*Example 7*

25 parts of N,N-dimethylformamide chloride is introduced at 0° to 20° C. into a suspension of 28.1 parts of 1-aminoanthraquinone-2-carboxylic hydrazide in 300 parts by volume of ethylene glycol monomethyl ether and then 35 parts by volume of pyridine is dripped in. The reaction mixture is heated to boiling temperature within thirty minutes, then allowed to cool and worked up as described in Example 6. 26 parts of 2-(1-aminoanthraquinonyl-(2))-1,3,4-oxadiazole is obtained as red crystals having a melting point of 294° to 295° C.

*Example 8*

19.4 parts of terephthalic dihydrazide is introduced into a solution of 55 parts of benzoic piperidide chloride in 300 parts by volume of ethylene glycol monomethyl ether which has been prepared at 0° C. and then 30 parts by volume of pyridine is dripped in. The reaction mixture is heated to boiling temperature within thirty minutes and then stirred for another hour at this temperature. The mixture is cooled and worked up as described in Example 1. 28 parts of 1,4-di-(5-phenyloxadiazolyl-(2))-benzene is obtained as colorless crystals having a melting point of 311° to 313° C.

*Example 9*

28.4 parts of N,N-dimethyl-p-methoxybenzamide chloride is reacted with 15 parts by volume of benzoic hydrazide in the way described in Example 1. 20.3 parts of 2-p-methoxyphenyl-5-phenyl-1,3,4-oxadiazole is obtained as colorless crystals having a melting point of 142° to 143° C.

*Example 10*

20 parts of N,N-dimethylcyclohexanecarboxylic amide chloride is reacted with 15 parts of benzoic hydrazide in the way described in Example 1. 19.5 parts of 2-phenyl-5-cyclohexyl-1,3,4-oxadiazole is obtained as colorless crystals having a melting point of 97° to 99° C.

*Example 11*

28.1 parts of 1-aminoanthraquinone-2-carboxylic hydrazide and 40 parts by volume of pyridine are added to a mixture, prepared at 0° C., of 25 parts of propionic piperidide chloride and 450 parts by volume of ethylene glycol monomethyl ether. The reaction mixture is heated at 120° C. for one hour and then cooled and filtered. The filter residue is washed with methanol and dried. 24 parts of 2-(1-aminoanthraquinonyl-(2))-5-ethyl-1,3,4-oxadiazole is obtained as red crystals having a melting point of 217° to 219° C.

*Example 12*

24.4 parts of benzoic piperidide chloride is reacted with 15 parts of isonicotinic hydrazide in the way described in Example 1. 18 parts of 2-γ-pyridyl-5-phenyl-1,3,4-oxadiazole is obtained as colorless crystals having a melting point of 145° to 147° C.

*Example 13*

7.4 parts of acetic hydrazide and 18 parts of pyridine are added to a mixture, prepared at 0° C., of 14.2 parts of N,N-dimethylacetamide chloride and 100 parts by volume of ethanol. The reaction mixture is boiled under reflux for one hour. The liquid phase is completely distilled off under subatmospheric pressure in a rotation evaporator. The distillate is fractionated. 6.8 parts of 2,5-dimethyl-1,3,4-oxadiazole is obtained as a colorless liquid having a boiling point of 176° to 178° C.

We claim:
1. A process for production of 1,3,4-oxadiazoles which comprises reacting a carboxylic amide chloride of the formula

$$\left[ R_1-C \underset{\underset{\overset{\oplus}{N}}{\diagdown}}{\overset{\diagup Cl}{\diagdown}} \underset{R_3}{\overset{R_2}{\diagup}} \right] Cl^{\ominus}$$

wherein $R_1$ is a member selected from the group consisting of hydrogen, alkyl with 1–4 carbons, cycloalkyl with 6–8 carbons, an aromatic group of the formula $$X-\!\!\!\left\langle\!\!\!\bigcirc\!\!\!\right\rangle$$

wherein X is a member from the group consisting of hydogen, methyl, alkoxy with 1–4 carbons, chloro, nitro and dialkylamino with 1–4 carbon alkyl groups; $R_2$ and $R_3$ represent a member selected from the group consisting of alkyl of 1–4 carbons and, when $R_2$ and $R_3$ are taken together, $-(CH_2-)_{4-6}$ at a temperature between 20° C. and 200° C. in the presence of a tertiary amine and an alcohol of the formula $R_4-O-R_5$ wherein $R_4$ is alkyl of 1–6 carbons and $R_5$ is selected from the group consisting of $-H$ and $-CH_2CH_2OH$ with a carboxylic hydrazide of the formula $$R_6-C\underset{NH-NH_2}{\overset{\diagup O}{\diagdown}}$$

wherein $R_6$ is a member selected from the group consisting of alkyl with 1–7 carbons, cycloalkyl with 6–8 carbons, C-pyridyl, anthraquinon-yl, anthraquinon-yl substituted with a member selected from the group consisting of a chloro group and 1–2 amino groups, phenyl, and phenyl substituted with a member selected from the group consisting of alkoxy with 1–4 carbons, chloro, dialkyl amino with 1–4 carbon alkyl groups, amino, nitro, and carboxylic hydrazide.

2. A process as claimed in claim 1, wherein said alcohol and said tertiary amine each is present in an amount of at least 0.5 mol. per mol. of said carboxylic amide chloride.

3. A process as claimed in claim 2 wherein said temperature is in the range of 50° C. to 170° C.

References Cited by the Examiner
UNITED STATES PATENTS 2,773,245  1/1956  Ainsworth _____ 260—307
3,065,238  11/1962  Weidinger et al. _____ 260—307

OTHER REFERENCES

Eilingsfeld et al., Angewandte Chemie, vol. 72, page 837 (1960).

Taylor et al., Sidgwick's Organic Chemistry of Nitrogen (Oxford, 1937), pages 153–155.

NICHOLAS S. RIZZO, *Primary Examiner.*

JOHN D. RANDOLPH, *Examiner.*